C. B. KURTZ.
TRANSMISSION CONTROL MECHANISM.
APPLICATION FILED MAR. 11, 1919.
1,381,713.
Patented June 14, 1921.
3 SHEETS—SHEET 1.
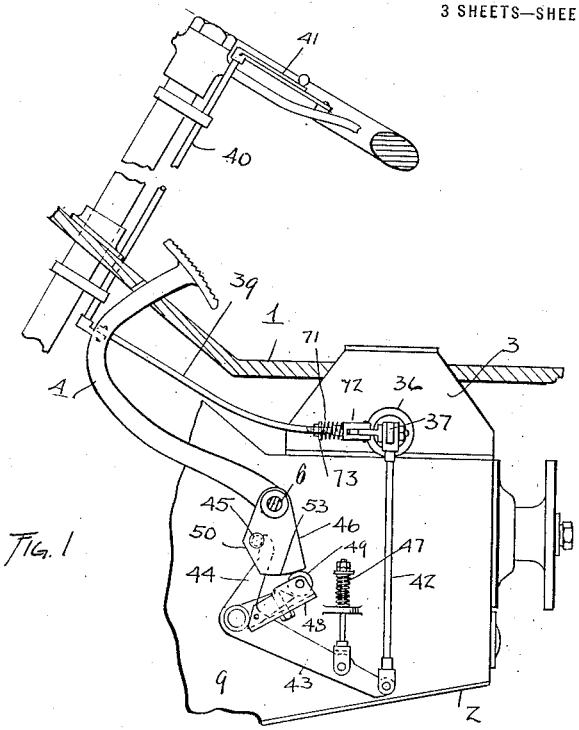
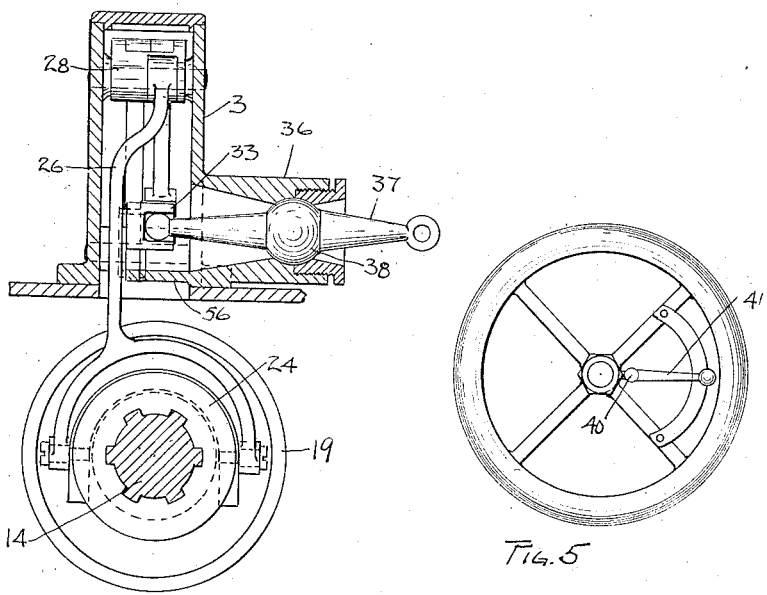
INVENTOR
Cyrus B. Kurtz.
By Fay, Oberlin & Fay
ATTORNEYS C. B. KURTZ.
TRANSMISSION CONTROL MECHANISM.
APPLICATION FILED MAR. 11, 1919.
1,381,713.
Patented June 14, 1921
3 SHEETS—SHEET 2.
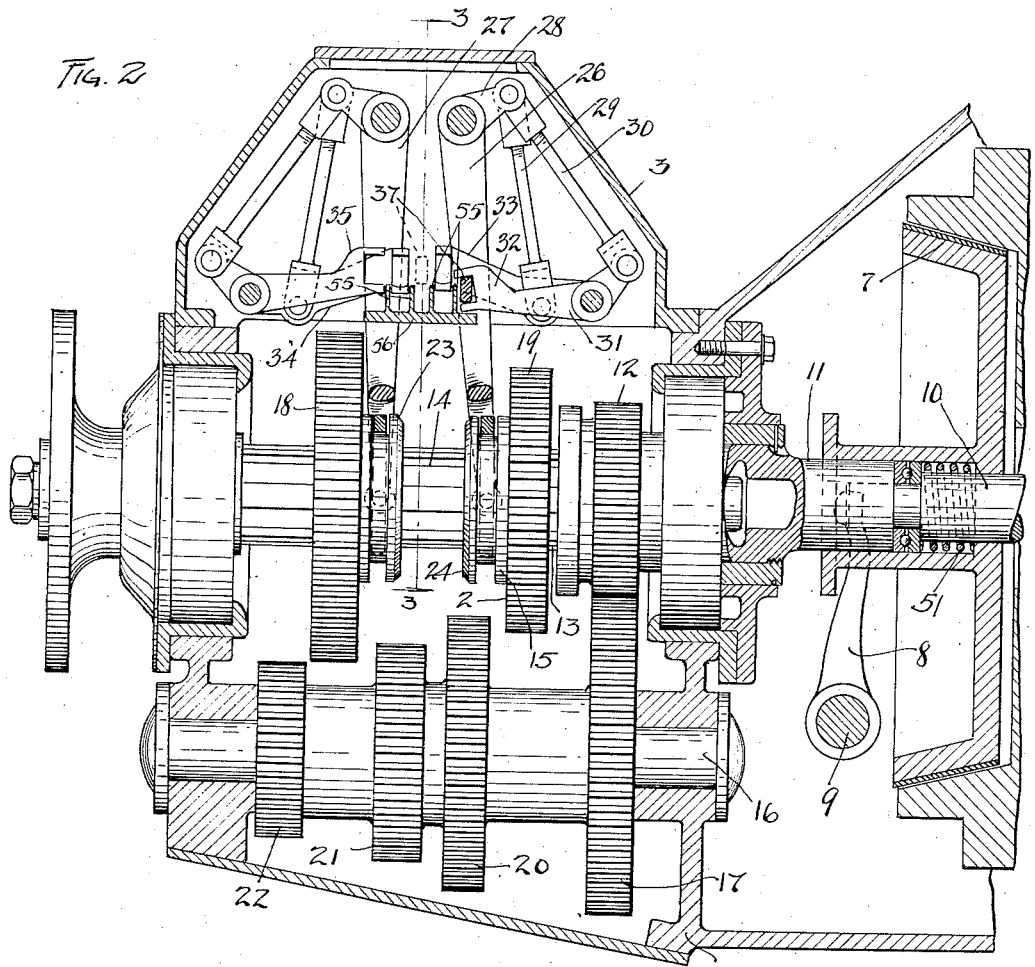
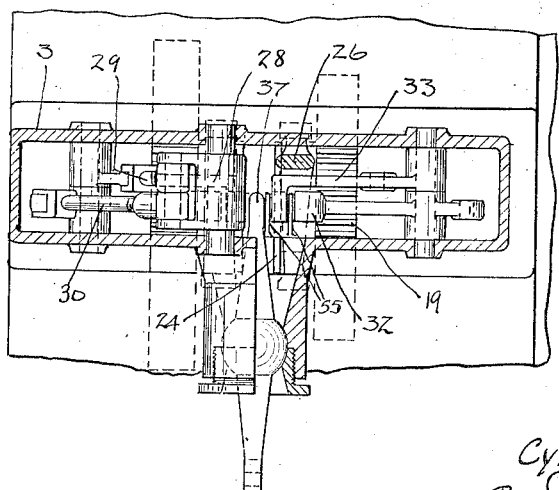
INVENTOR
Cyrus B. Kurtz.
By Fay, Oberlin & Fay
ATTORNEYS.

C. B. KURTZ.
TRANSMISSION CONTROL MECHANISM.
APPLICATION FILED MAR. 11, 1919.
1,381,713.
Patented June 14, 1921.
3 SHEETS—SHEET 3.
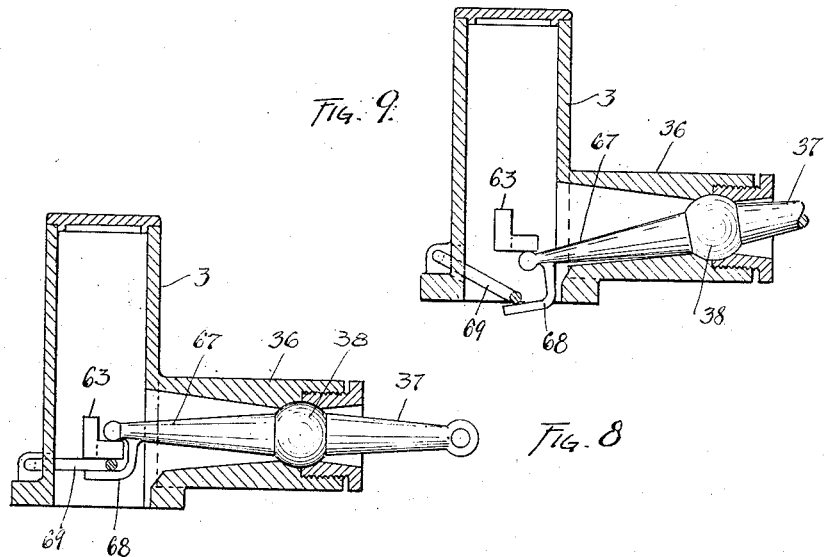
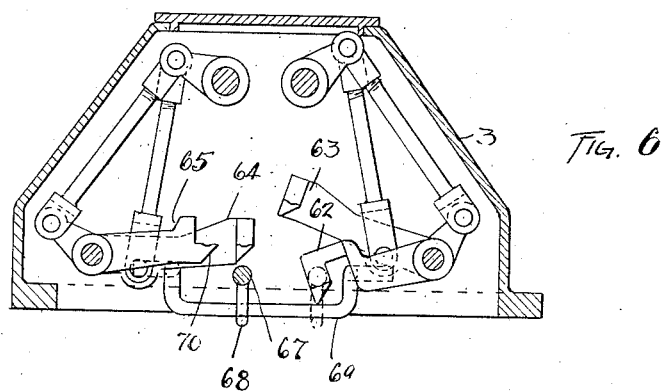
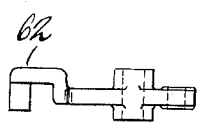
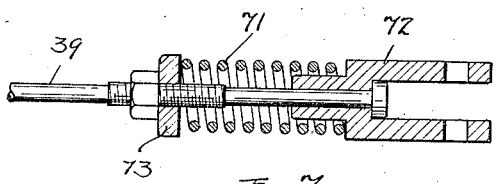
INVENTOR
Cyrus B. Kurtz
By Day, Oberlin & Day
ATTORNEYS.

UNITED STATES PATENT OFFICE.

CYRUS B. KURTZ, OF LAKEWOOD, OHIO.

TRANSMISSION-CONTROL MECHANISM.

1,381,713.　　　　Specification of Letters Patent.　　Patented June 14, 1921.

Application filed March 11, 1919. Serial No. 282,008.

*To all whom it may concern:*

Be it known that I, CYRUS B. KURTZ, a citizen of the United States, and a resident of Lakewood, county of Cuyahoga, and State of Ohio, have invented a new and useful Improvement in Transmission-Control Mechanism, of which the following is a specification, the principle of the invention being herein explained and the best mode in which I have contemplated applying that principle, so as to distinguish it from other inventions.

The present improvements, relating, as indicated, to transmission control mechanism, and more particularly directed to the provision of a simple and convenient means for controlling the action of what is commonly known as a selective sliding gear transmission, which is the type now in general use in motor driven vehicles. The present improvements are further designed to adapt the transmission control apparatus, which is described and claimed in my co-pending applications, Serial Nos. 203,102 and 251,044, filed November 21, 1917, and August 23, 1918, respectively, to a sliding gear transmission. Further objects of the invention consist in the provision of a simple apparatus for the purpose stated, which may be readily attached to the standard transmission mechanism now in use in vehicles without change, other than the removal of the control lever and the top of the transmission case. Further objects of the invention will be apparent from the following description. To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

In said annexed drawings:—

Figure 1 is a side elevation showing my improvements as applied to a standard selective sliding gear transmission: Fig. 2 is a longitudinal vertical section through the transmission; Fig. 3 is a vertical transverse section on the line 3—3, Fig. 2; Fig. 4 is a plan view with the cover removed from the transmission case, showing the transmission mechanism; Fig. 5 is a plan view showing the manually operated part of the control mechanism; Fig. 6 is a section similar to Fig. 2, but showing a slightly modified type of control mechanism; Fig. 7 is an enlarged view in section of a portion of the rod 39; Fig. 8 is a view similar to Fig. 3, but illustrating the construction of the ball lever for the modified form of my device; and Fig. 9 is a view similar to Fig. 8, but showing the ball lever in a different position; and Fig. 10 is a plan view of the member 62 shown in Fig. 8.

The selective sliding gear transmission is at present the standard transmission used in all motor-driven vehicles, and is practically the only type of transmission which is now in use. One of the chief objections to this type of transmission, however, is the personal skill which is required to operate it properly and to mesh the various sliding gears without clashing, which of course causes breakage on the teeth and sometimes serious damage to the transmission. To eliminate the personal element in the control of such transmission it has been proposed, and several times attempted, to substitute a series of electromagnetic elements for shifting the gears into their various positions, but such apparatus is not only a considerable additional expense, but is also not entirely satisfactory, as it does not wholly prevent clashing of the gears, while it requires a considerable amount of current from a storage battery to operate it.

My invention provides a very simply applied device to the standard transmission case, upon the removal of the top of usual case, which not only removes to a large extent the personal element in the shifting of the gears, but relieves the operator of the severe physical effort which is required in many cases to perform the shift from one gear to another.

In Fig. 1 I have shown the device as applied to the standard transmission mechanism, and, for the purpose of illustration only, to a transmission mechanism as it would be mounted beneath the floor boards 1 of a motor vehicle. Obviously, other uses for my improved transmission will readily suggest themselves to those skilled in the various arts. The transmission is housed in the usual case 2, of which the cover plate is removed, and an extension or open casing 3 is substituted therefor, which carries the elements of my device. The usual clutch pedal 4 is shown passing through an opening in the floor boards 1 adjacent to a steering column 5, this clutch pedal being pivoted upon a boss formed on the side of the transmission case at 6.

Referring now to Fig. 2, there is shown a sectional view of the transmission itself, which has associated with it a main or engine clutch 7 which is operated into and out of engagement by means of a shifting lever 8, attached to a pivoted stud 9 passing through the side of the case and operated to actuate the clutch in the usual manner. The elements of the clutch 7 are connected respectively to an engine shaft 10 and to a driven shaft 11. This latter shaft extends into the case 2 proper, and carries the usual driving gear 12 at its forward end. This shaft 12 has the usual spined end 13 adjacent the second driven shaft 14, which has a slidable sleeve 15 for engaging it with the shaft 11. A secondary parallel shaft 16 is also mounted in the case and carries a gear 17, which is constantly in mesh with the gear 12 on the driving shaft 11.

It is scarcely necessary to describe in detail the construction of the transmission as it is of the usual type, in which there are slidably mounted gears 18 and 19 on the shaft 14, of which the gear 19 may be moved forward, that is, to the right, as shown in Fig. 2, to cause engagement of the shafts 11 and 14, or to the left, to engage with the gear 20 on the shaft 16, which provides the second or intermediate speed of the transmission. The gear 18 is also movable in both directions, and when moved forward is engaged with the gear 21 to provide the lowest forward speed of the transmission, and when moved to the left, is engaged through an idle gear (not shown), which drives through the usual countershaft with gear 22 to secure a reverse drive of the driven shaft 14.

Shifting collars 23 and 24 are attached to the gears 18 and 19, respectively, as is customary in such transmission. My improved control or operating means for such transmission include pivoted forked levers 26 and 27, the lower ends of which engage respectively in the shifting collars 24 and 23. The forked lever 26 has its shorter arm 28 connected by two links 29 and 30, with bell crank levers 31, the longer arms 32 and 33 of which extend horizontally in parallel relation for the purpose which will presently be described. The other bell crank lever 27 is similarly connected to operate arms or levers 34 and 35.

Mounted in an extension 36 of the upper case or top 3 is a member 37, which is pivoted on a spherically formed portion 38 to rock both horizontally and vertically, thus giving the member a universal movement. The inner end of this lever 37 is formed in the shape of a disk and is normally mounted to lie between the spaced ends of the levers 32, 33, 34 and 35, each of which is provided with a notch or recess in its end, which is adapted to receive the disk end of the ball lever 37 upon movement of this lever 37 in a horizontal plane. The ball lever may be rocked horizontally to engage its inner end in any one of the forked or notched ends 32, 33, 34 and 35, which have already been described. When the ball lever is then rocked vertically to depress its inner end it depresses whichever one of the ends 32, 33, 34 or 35 it is engaged with, and in this way rocks one of the bell crank levers 26 or 27, either forward or back to cause engagement either of the direct drive sleeve or of the other gears which have been described. Assume that the inner end of the ball lever is engaged with the end 33 of the bell crank lever 31 and is then depressed. It then actuates the gear 19 and sleeve 13 to the right, causing this sleeve to engage over the engine shaft to produce a direct drive through the transmission. During this action the lever 29 is also actuated, but in the same direction. If the ball lever is engaged with the inner end of the bell crank lever 33. the lever 29 is actuated instead of the lever 30, thus producing an opposite pivotal movement of the bell crank lever 26 and an actuation of the gear 19 to the left into engagement with the gear 20 on the secondary shaft, thus giving the second or intermediate speed between the driving and driven shafts. The same action is secured by the construction of the lever ends 34 and 35, and the gear 18 may thus be actuated to the right or left to engage either the low forward driving speed or the reverse speed. Disengagement of the ball lever from any selected one of the members 32, 33, 34 and 35 is prevented during operation of the latter by means of guards 55 formed on a plate 56 and extending upwardly, defining the operative positions of the members 32, 33, 34 and 35. These guards prevent any lateral movement or displacement of the ball arm 37 until the ball arm, together with the lever end with which it is engaged, are returned to the normal inoperative position or plane.

The ball lever may be set or moved to select the desired speed, that is, to engage with whichever lever end 32, 33, 34 or 35 it is desired to operate by being rocked horizontally through a rod 39 connected to the outer end of the ball lever and a shaft 40 which is intended to be mounted adjacent to the steering column 5 and to terminate at its upper end in a small manually operated lever 41.

In Fig. 5 is shown the manual member 41 mounted adjacent to a quadrant 60, on which are indicated the various gear connections by the characters, R. 1, 2 and 3, which means reverse, first speed, second speed and direct connection, respectively. Movement of the lever 41 to these positions brings the small lever 37 into position to effect engagement of the corresponding connection in the transmission.

The ball lever is rocked vertically to secure the actual engagement of the preliminarily selected gear by means of a link 42 and bell crank lever 43, which is pivoted to the side of the case 2. The other end 44 of the bell crank lever 43 is engaged by a stop 45 mounted on a cam 46, which is attached to, and operated by, the clutch pedal 4. A spring 47 serves to normally maintain the lever 43 and rod 42 in the operating or lead position, which is shown in Fig. 2. The clutch-operating shaft 9 carries externally of the case, a lever 48 and roller 49, of which the latter contacts against the edge of the cam 46. In the normal position of the clutch pedal the roller 49 is in contact with the surface 50 of the plate or cam 46, which permits the clutch spring 51 to engage the clutch.

From the foregoing description it will be seen that the ball lever or operating member has a one direction movement out of a neutral plane which is defined by the lever ends 32, 33, 34 and 35. The lever also has a neutral position in the neutral plane. The connections between the lever ends 32, 33, 34 and 35 act to translate this one direction action or movement of the ball lever into a two direction movement of the shifting levers from their respective neutral planes or positions. In this way the small lever need have but a single movement out of its selecting or neutral plane, and yet the double action that is required of the shifting levers can be secured without any of the complications that is otherwise necessary.

A further advantage of this simplicity of control is that it allows the few operating parts to be directly fastened to a cover plate 3, which may be constructed to substitute for the usual cover plate, allowing for the application of my improved gear control to old cars as well as its use in new ones at but a slight additional expense.

The operation of the mechanism involves, first, the depression of the clutch pedal which swings the cam 46 to the right, thus moving the clutch-operating shaft and rod 48 in a clockwise direction until the roller 49 engages the arc-shaped surface 53 on the cam. Further movement of the clutch pedal merely holds the clutch in this disengaged position. When the clutch is first depressed and disengaged the ball lever is shifted to the desired position by means of the indicating or operating handle 41, and the clutch is then permitted to reëngage. This return movement of the clutch pedal allows the spring 47 to pull upwardly the rod 42 and thus depress the inner end of the ball arm to shift the previously selected gear into engagement before the clutch starts to engage.

In Figs. 6 to 9 I have shown a slightly modified control mechanism, constructed to make it possible to preliminarily select whichever driving mechanism or gear is to be used. Ordinarily I believe the user will prefer to use the mechanism heretofore described, in which no preliminary selection is possible, that is, the mechanism cannot be set before the clutch is disengaged for an automatic shifting of the gears upon the disengagement and reëngagement of the clutch. Under some circumstances, however, it may be desirable to preliminarily select or set the mechanism so that immediately and automatically, upon disengagement of the clutch and its reëngagement the preselected speed will be engaged.

In Fig. 6 I have shown a view similar to Fig. 2 with connection ends 62, 63, 64 and 65, corresponding respectively with the ends 32, 33, 34 and 35 in Fig. 2. These connection ends in Fig. 6, however, are not yokes and do not inclose the selecting and operating member 67 as is the case in the construction of Fig. 2. Each of the connection ends of Fig. 6 is an L-shaped member having a ledge or shoulder upon which the end of the member 67 may engage. The member 67 is provided with a depending L-shaped finger 68. which engages beneath and controls the movement of a pivoted U-shaped strap 69, which is operated by the member 67 to return to normal position any one of the lever ends that has been operated. The finger 68 and rod 69 constitute a positive connection between the member 67 and the connection end that is operated.

The lower faces of each of the connection ends 62, 63, 64 and 65 is formed with a beveled surface 70 to permit connection of the selecting member, which will presently be described. Furthermore, in the rod 39, (see Fig. 1 and Fig. 7) I have interposed a spring 71 operating between a yoke end 72 on this rod and the nut 73, also mounted on the rod, to permit of relative movement between the rod proper and the end of the rod or yoke, which is connected to the outer end of the operating lever 67.

The operation of this modification is as follows:—The member 67 may be shifted over any desired lever end and then rocked to depress such selected lever end and engage a corresponding gear. If it is desired to preliminarily select any gear for operation the member 67 is moved beneath the normal level of the other connection ends to a position directly beneath the selected lever end, and is then allowed to remain in that position. The gear which has previously been engaged remains in engagement because of the normal resistance to movement of the corresponding gears in the transmission when in operative engagement. To complete the shift and to engage the previously selected gear it is then necessary only to disengage the clutch and permit of its reengagement without any further manual operation or movement of the controlling lever 41 for the member 67. The disengaging movement of the clutch rocks the member 67 about its axis and lifts the inner end of this member upwardly. The ball lever will engage against the bevel end of the selecting lever end which it is beneath and will be pressed laterally out of position while returning to its normal horizontal plane, and this action is permitted by means of the spring 71 in the rod 39. This lateral movement of the ball lever will compress the spring 71 which will return the ball lever to the normal vertical plane immediately upon its being raised to a level above that of the selecting lever end. Thus, when the clutch has been thrown out, the ball lever has been brought to an operating position above the connection ends selected for operation, and the return movement of the clutch will operate the mechanism as in the other form. As the ball lever is returned to its normal horizontal position the finger 68 will raise the member 69, which in turn will return the formerly depressed connection end to its normal position in line with the other members. It is necessary in this modified form to set the axis for the ball member 67 at a correct distance from the connection ends than in the previous form in order to give a greater movement to the inner end of this lever and depress it below the other ends of the connections when operated, as otherwise it could not be moved laterally to select any other connection end without first being returned to normal position. It is also necessary to offset the engaging portion of the connection ends 62 in the manner shown in Fig. 6 to permit of engagement therewith by the ball lever, which would be impossible with the action described if the construction of Fig. 4 were retained.

Other modes of applying the principle of my invention may be employed instead of the one explained, change being made as regards the mechanism herein explained, provided the means stated by any of the following claims or the equivalent of such stated means be employed.

I therefore particularly point out and distinctly claim as my invention:—

1. The combination with a selective sliding gear transmission having a plurality of shiftable sliding gears; of a series of gear-shifting levers; operating connections therefor connected in pairs and each connection being adapted upon a one-direction actuation to cause opposite movement of said levers, and a pivotally mounted selecting and operating member adapted to engage and actuate in the same direction either of the connections of each of said pair of connections, thereby effecting different movements of said shifting levers.

2. The combination with a selective sliding gear transmission having a plurality of shiftable sliding gears; of a series of gear-shifting levers capable of pivotal movement in opposite directions from a neutral position; actuating elements therefor pivotally mounted in pairs with their ends normally in a single neutral plane, each such pair of said elements being adapted to effect reverse movements of one of said shifting levers upon a one-direction movement of said elements; and a combined selecting and operating member pivotally mounted and arranged to move in such neutral plane into position to engage one of said elements, said member being then adapted to pivotally move at an angle to such plane to operate the selected element and effect operation of one of said shifting levers.

3. The combination of a selective sliding gear transmission having a plurality of shiftable sliding gears; of a series of movable gear-shifting levers capable of movement in opposite directions from a neutral position; operating connections for said levers, said connections being constructed to effect reverse movements of said levers upon a one-direction movement of the ends of said connections from a neutral plane; and an operating member pivotally mounted to move in such plane into position to engage one of said ends of said connections, said member being pivotally movable in a single direction from such plane to effect operation of the selected lever end.

4. The combination of a selective sliding gear transmission having a plurality of shiftable sliding gears, and a main clutch associated with the driving shaft of said transmission; of a series of pivoted gear-shifting levers capable of movement in opposite directions from a neutral position; operating connections for said levers, said levers being constructed to effect reverse movements of said levers upon a direction movement of the ends of said connections from a neutral plane; and a universally mounted operating member, manual means adapted to move said member in a neutral plane into position for engagement with a selected end of one of said connections; and means connecting said member and said clutch, said means being adapted to cause said member to operate such selected end prior to engagement of said clutch.

5. The combination of a selective sliding gear transmission having a plurality of shiftable sliding gears, and a main clutch associated with the driving shaft of said transmission; of a pivoted gear-shifting lever capable of movement in opposite directions from a neutral position; operating connections for said lever, said connections being constructed to effect reverse movements of said lever upon a one-direction movement of the ends of said connections from a neutral plane; a universally mounted operating member, manual means adapted to move said member into selected positions in such plane, and means operated by said clutch and adapted to move said member in parallel planes at an angle to such neutral plane, and translating connections between said lever and said member, said connections being adapted to translate one direction clutch-operated movements of said member from said first-named plane into opposite, two direction movements of said shifting lever from its neutral position.

6. The combination of a selective sliding gear transmission having a plurality of shiftable sliding gears, and a main clutch associated with the driving shaft of said transmission; of a pivoted gear shifting lever capable of movement in opposite directions from a neutral position; operating connections for said lever, said connections being constructed to effect reverse movements of said lever upon a one-direction movement of the ends of said connections from a neutral plane; a universally mounted operating lever, manual means adapted to move said member into selected positions in one plane, and means operated by said clutch and adapted to move said member in parallel planes at an angle to said first-named plane, and translating connections between said levers and said member, said connections being adapted to translate one direction clutch-operated movements of said member from said first-named plane into opposite, two direction movements of said shifting lever from its position, and interlocking means adapted to prevent engagement of said main clutch until the selected operation of said gear-shifting levers is accomplished.

7. In combination with an automobile transmission mechanism, and casing therefor, a cover plate for the transmission carrying gear-shifting levers, operating connections therefor having elements arranged in a neutral plane for one direction, operating movement therefrom, said elements and connections being adapted to effect opposite, two-direction movements of said shifting levers from a neutral position, and a single member movable in one plane into engagement with a selected one of said elements, and movable in one direction therefrom to operate such selected element, connection and gear-shifting lever.

8. The combination with a selective sliding gear transmission having a plurality of shiftable sliding gears and a main clutch associated with the driving shaft of said transmission; of two separate pivotally mounted gear-shifting levers each adapted to be moved in each of two directions from a neutral position to effect a shifting of the gears in said transmission; a double translating connection attached to each of said levers, each connection having two alined actuating ends movable in the same direction but effecting reversal movement of said shifting lever attached thereto, and the actuating ends of all said connections lying in the same neutral plane; and a pivotally mounted operating member arranged to move in such neutral plane into position to engage any one of said actuating ends, said member having also one direction pivotal movement to operate a selected actuating end of one of said connections.

9. The combination with a selective sliding gear transmission having a plurality of shiftable sliding gears; a pivotally mounted gear-shifting lever adapted to be moved in each of two directions from a neutral position to effect a shifting of the gears in said transmission; a double translating connection attached to said lever, each connection having two alined actuating ends movable in the same direction but effecting reversal movement of said shifting lever attached thereto, and the actuating ends of said connections being in alinement in a neutral plane with a neutral space in that plane therebetween; and an operating member arranged to move in such neutral plane into position to engage any one of said actuating ends, said members having also a one-direction movement from such neutral plane to operate a selected actuating end of one of said connections.

10. The combination with a selective sliding gear transmission having a plurality of shiftable sliding gears and a main clutch associated with the driving shaft of said transmission; of two separate pivotally mounted gear-shifting levers each adapted to be moved in each of two directions from a neutral plane to effect a shifting of the gears in said transmission; a double translating connection attached to each of said levers, each connection having two alined actuating ends movable in the same direction but effecting reversal movement of said shifting lever attached thereto, and the actuating ends of all said connections being in alinement in a neutral plane with a neutral space in that plane therebetween; an operating member arranged to move in such neutral plane into position to engage any one of said actuating ends, said members having also a one-direction movement from such neutral plane to operate a selected actuating end of one of said connections; and connections between said member and said clutch adapted to cause actuating operation of said member prior to the engagement of said clutch.

11. The combination with a selective sliding gear transmission having a plurality of shiftable sliding gears and a main clutch associated with the driving shaft of said transmission; of two separate pivotally mounted gear-shifting levers each adapted to be moved in each of two directions from a neutral plane to effect a shifting of the gears in said transmission; a double translating connection attached to each of said levers, each connection having two alined actuating ends movable in the same direction but effecting reversal movement of said shifting lever attached thereto, and the actuating ends of all said connections being in alinement in a neutral plane with a neutral space in that plane therebetween; an operating member arranged to move in such neutral plane into position to engage any one of said adjusting ends, said members having also a one direction movement from such neutral plane to operate a selected actuating end of one of said connections; manually operable means adapted to selectively position said member with respect to said actuating ends; and connections between said member and said clutch adapted to cause actuating operation of said member prior to the engagement of said clutch.

12. The combination with a selective sliding gear transmission having a plurality of shiftable sliding gears and a main clutch associated with the driving shaft of said transmission; of two separate pivotally mounted gear-shifting levers each adapted to be moved in each of two directions from a neutral plane to effect a shifting of the gears in said transmission; a double translating connection attached to each of said levers, each connection having two alined actuating ends movable in the same direction but effecting reversal movement of said shifting lever attached thereto, and the actuating ends of all said connections being in alinement in a neutral plane with a neutral space in that plane therebetween; an operating member arranged to move in such neutral plane into position to engage any one of said actuating ends, said members having also a one direction movement from each neutral plane to operate a selected actuating end of one of said connections, manually operated means adapted to selectively position said member with respect to said actuating ends; connections between said member and said clutch adapted to cause actuating operation of said member prior to the engagement of said clutch; and means adapted to prevent selective movement of said member during the engagement of said clutch.

13. The combination with a sliding gear transmission having shiftable sliding gears; of gear shifting levers, connections therefor; and a single selecting and operating member pivotally mounted to selectively move in one plane into position to engage one of said connections, said member being pivotally movable in a second plane to operate such selected connection, said member being normally free from said connections but positively engaging the same and maintaining such engagement during operation.

14. The combination with a sliding gear transmission having shiftable sliding gears; of gear shifting levers, connections therefor, said connections having alined ends; and a selecting and operating member selectively movable into position to positively engage one of such ends of said connections, said member being then movable to depress such engaged end below the adjacent ends of said other connections, laterally mounted guards adapted to prevent lateral displacement of said member while in engagement with such operated connection end.

15. The combination with a selective sliding gear transmission having shiftable sliding gears; of gear shifting levers, connections therefor having adjacently arranged ends provided with alined recesses forming a neutral plane; guards between such adjacent ends; a selecting and operating member movable in such plane into any selected recess, said member being movable in a second plane to depress such selected connection, said member being then inclosed in the recess in said depressed connection end and the adjacent guards.

Signed by me, this 3rd day of February, 1919.

CYRUS B. KURTZ.